UNITED STATES PATENT OFFICE 2,507,992

REGENERATION OF ANION EXCHANGE RESINS

John H. Payne and Hugo P. Kortschak, Honolulu, territory of Hawaii, assignors to Pacific Chemical & Fertilizer Company, Honolulu, territory of Hawaii, a corporation of the territory of Hawaii No Drawing. Application June 15, 1948, Serial No. 33,237

8 Claims. (Cl. 127—46)

This invention relates to a process involving the utilization of anion exchange resins and more particularly to a process of regenerating anion exchange resins of the amine-aldehyde type.

Anion exchange resins have been used commercially in the treatment of liquid materials in order to remove acids from solution. There are a large number of anion exchange resins commercially available and in general they comprise water-insoluble condensation products containing free amino groups bound in a porous matrix. These resins may be granular in nature and may be arranged in the form of a porous bed for the treatment of various types of aqueous media for the removal of acids therefrom. Thus anion exchange resins are useful in removing acids from solutions without introducing ash constituents into the solutions. In practice it is only necessary to pass an acid solution through a bed of the anion exchange resin. The acid will be retained by the resin in the bed and the acid-free solution will pass through the bed. Commercial solutions which have been subjected to treatment by anion exchange resins are impure sugar solutions, such as cane juice, which contain acidic impurities. For example, as disclosed in patent application Serial No. 359,575 of Pieter Smit and published by the Alien Property Custodian on May 11, 1943, sugar solutions may be advantageously treated with an anion exchange resin in order to remove certain of the undesirable constituents therefrom. These constituents are generally acidic in nature and they are separated from the sugar solution without the introduction thereinto of other foreign agents.

It will be apparent that anion exchange resins become exhausted after a period of use and it is necessary periodically to regenerate them. In the past it has been the practice to regenerate such resins by contacting them directly with an aqueous solution of an alkali, such as sodium hydroxide, sodium carbonate or ammonium hydroxide. These alkalies react with the acid constituents bound to the resin, thus liberating them and the thus liberated constituents may then be washed from the bed of resinous material. The exchange resin is then ready for re-use.

Anion exchange resins that have been extensively used in the prior art in the manner indicated above are those resins that are formed by the condensation of an amine with an aldehyde. For example, the anion exchange resin known as Amberlite IR-4B produced and sold by the Resinous Products Corporation of Philadelphia, is a well known type and is prepared by the condensation of an aromatic amine with formaldehyde. This resin contains in the neighborhood of 14% nitrogen. Other anion exchange resins may be prepared by the condensation of an aliphatic amine with formaldehyde or other aldehydes, examples of which are those resins known as Duolites. While anion exchange resins of the amine-aldehyde type, such as those indicated above, are particularly useful in accordance with the herein disclosed invention, it will be apparent that other similar materials may be employed and particularly those containing free amine groupings.

This invention relates primarily to the regeneration of anion exchange resins. As indicated above, the prior art has suggested that these materials be regenerated by treating with aqueous solutions of readily soluble alkalies, such as sodium hydroxide, sodium carbonate, or ammonium hydroxide. However, the cost of regenerating an anion exchange resin by the use of the aforementioned chemicals represents a considerable item of expenditure in processes where they are employed. The use of dilute solutions of less expensive calcium hydroxide has been suggested. However, this has not been entirely satisfactory since calcium hydroxide is only soluble in water to a limited extent and the time factor and the volume of water required make the use of this reagent undesirable.

Accordingly it is one object of this invention to provide a process for the regeneration of an anion exchange resin and particularly an anion exchange resin of the amine-aldehyde type.

A further object of this invention is the provision of an inexpensive process for regenerating an anion exchange resin which may be rapidly carried out and which is inexpensive.

A still further object of this invention is the provision of a process for regenerating an anion exchange resin of the aromatic amine-aldehyde type which finds particular use in a sugar refining process.

Further and additional objects will appear from the following description and the accompanying claims.

It has been found in accordance with this invention that an at least partially exhausted anion exchange resin may be regenerated by contacting the resin with a solid hydroxide of a metal selected from the group consisting of calcium, magnesium, barium and strontium. Thus in accordance with this invention an at least partially exhausted anion exchange resin of the amine-aldehyde type may be regenerated by contacting the resin with an aqueous slurry containing suspended solid particles of a metal hydroxide selected from the group consisting of the hydroxides of calcium, magnesium, barium and strontium. In carrying out this invention in one form the anion exchange resin may be arranged in the form of a bed in a suitable treating chamber in the manner customary to the art. The resin may then be treated with an impure cane juice or other aqueous solution from which it is desired to remove the acid constituents. This contact is usually effected by passing the solution continuously through the anion exchange resin bed until such time as the resin becomes substantially exhausted with respect to its ability effectively to remove acid-reacting substances. The flow of liquid through the bed is then discontinued and the bed is subjected to a regeneration procedure. In accordance with this invention, the regeneration procedure comprises passing an aqueous slurry of the solid particles of the alkaline-reacting metal hydroxide directly through the bed of resinous material. It has been discovered that the slurry treatment is very effective for the regeneration of the resin and after regeneration the bed may be washed and again used for removing the acidic constituents from cane juice or other fluid to be treated.

In accordance with one embodiment of this invention, it is preferred that the slurry be passed through the resin bed in an upward direction. That is, the regenerating slurry should be introduced into a bottom portion of the bed and withdrawn from a top portion thereof. This upward flow is desirable since it tends to prevent settling and clogging of the bed with solid particles of the metal hydroxide. Similarly it is usually desirable that the wash water employed after regeneration also be passed upwardly through the bed in order to minimize clogging and to effect rapid removal of reactants and unreacted hydroxide.

For a more complete understanding of this invention, reference will be made to the following examples which illustrate the advantages to be obtained. It will be understood, however, that this invention is not to be limited to the specific conditions indicated in the examples.

*Example I*

Eight grams of calcium hydroxide (0.22 equivalents) were mixed in 200 cc. of water and the resulting slurry was passed downwardly through a bed of 100 cc. of exhausted anion exchange resin in a 25 mm. tube at a rate of 25 cc. per minute. The resin was an Amberlite IR–4B aromatic amine-aldehyde resin containing about 14% nitrogen which had been exhausted with the anions from cane juice passed therethrough having absorbed 0.19 equivalents of acid therefrom. Some clogging of the resin bed was noted due to the accumulation of lime. The bed was then washed with 2 liters of water and it was noted that 0.18 equivalents of lime were consumed in regenerating the resin. Thus a regeneration efficiency of greater than 80% was obtained based upon the amount of lime passed through the bed.

*Example II*

Twenty grams of lime (0.54 equivalents) were stirred with 400 cc. of water and the slurry was passed upwardly through an exhausted 100 cc. bed of Amberlite IR–4B at a rate of 25 cc. per minute. Thereafter the bed was washed with 2 liters of water. The resin prior to exhaustion had a capacity of 0.21 equivalents of acid and when the exhausted resin was treated as above indicated, 0.19 equivalents of alkalinity were removed. In this example the efficiency of regeneration was somewhat less than in Example I because considerable excess lime was employed. However, the upflow method of treating the resin with the slurry of calcium hydroxide was advantageous since no clogging of the resin bed occurred during treatment.

It will be apparent from the foregoing that a rapid inexpensive method has been provided for the regeneration of an anion exchange resin. Because the cost of lime is only a fraction of that of commonly employed alkaline-reacting regenerating materials, substantial savings result by employing this process even though a large excess of lime may be employed in the regeneration process. Inasmuch as it has been found that the solid slurry can be very effectively employed, only a relatively small volume of water is necessary for regeneration and a considerable saving of time is effected over a process which depends for regeneration on an aqueous solution of calcium hydroxide or other alkaline-reacting metal hydroxide. It has been calculated that if only a saturated water solution of lime had been employed as a regenerating agent under the conditions indicated in Example I, then twenty-five times the volume of regenerant would be required with a corresponding increase in time.

In the examples given above only calcium hydroxide (lime) is specifically mentioned. However, the other alkaline-reacting metal hydroxides which are relatively insoluble in water may be employed to equal advantage. Examples of such metal hydroxides are strontium hydroxide, magnesium hydroxide and barium hydroxide.

While particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention.

We claim:

1. A process of regenerating an at least partially exhausted anion exchange resin which comprises contacting said resin with a liquid slurry of solid particles of a hydroxide of a metal from the group consisting of calcium, magnesium, barium and strontium.

2. A process of regenerating an at least partially exhausted anion exchange resin which comprises contacting said resin with water having suspended therein solid particles of a hydroxide of a metal from the group consisting of calcium, magnesium, barium and strontium.

3. A process of regenerating an at least partially exhausted anion exchange resin of the amine-aldehyde type in a porous bed which comprises passing through said bed an aqueous slurry of solid particles of a hydroxide of a metal from the group consisting of calcium, magnesium, barium and strontium, and thereafter washing said bed with water.

4. A process of regenerating an at least partially exhausted anion exchange resin of the amine-aldehyde type arranged in a porous bed which comprises passing upwardly through said bed an aqueous slurry of solid particles selected from the group consisting of the hydroxides of calcium, magnesium, barium and strontium, and after regeneration has been effected passing wash water upwardly through said bed whereby said resin is conditioned for re-use.

5. In a sugar refining process wherein anions are removed from impure aqueous sugar solutions by direct contact with a porous bed of an anion exchange resin of the amine-aldehyde type, the step of regenerating said resin after at least partial exhaustion which comprises passing upwardly through said bed an aqueous slurry having suspended therein solid particles of a hydroxide of a metal selected from the group consisting of calcium, magnesium, barium and strontium.

6. In a cane sugar refining process wherein anions are removed from cane sugar juice by direct contact with a granular bed of an anion exchange resin of the aromatic amine-aldehyde type, the step of regenerating said resin after at least partial exhaustion which comprises passing upwardly through said bed an aqueous slurry having solid calcium hydroxide particles suspended therein, and after regeneration passing wash water through said bed to remove residual calcium hydroxide.

7. A process of regenerating an at least partially exhausted anion exchange resin which comprises contacting said resin with a liquid slurry of solid particles of calcium hydroxide.

8. A process of regenerating an at least partially exhausted anion exchange resin of the amine-aldehyde type which comprises passing an aqueous slurry of solid calcium hydroxide particles upwardly through a porous bed of said resin until at least partial regeneration is effected, and then washing said resin by passing water therethrough to effect the removal of excess calcium hydroxide therefrom.

JOHN H. PAYNE.
HUGO P. KORTSCHAK.

REFERENCES CITED

The following references are of record in the file of this patent:

UNITED STATES PATENTS

| Number | Name | Date |
|---|---|---|
| A.P.C. 359,575 | Smit | May 11, 1943 |
| 2,413,791 | Shafor | Jan. 7, 1947 |
| 2,413,844 | Rawlings | Jan. 7, 1947 |
| 2,451,272 | Blann | Oct. 12, 1948 |